(12) United States Patent
Strong

(10) Patent No.: US 7,225,711 B2
(45) Date of Patent: Jun. 5, 2007

(54) DIE HEAD ASSEMBLY FOR NIBBLER TOOL

(76) Inventor: Joseph M. Strong, 55 Teed Ave., Barrington, RI (US) 02806

(*) Notice: Subject to any disclaimer, the term of this patent is extended or adjusted under 35 U.S.C. 154(b) by 242 days.

(21) Appl. No.: 10/757,945

(22) Filed: Jan. 15, 2004

(65) Prior Publication Data

US 2004/0144225 A1      Jul. 29, 2004

Related U.S. Application Data

(60) Provisional application No. 60/440,930, filed on Jan. 17, 2003.

(51) Int. Cl.
*B26D 1/00* (2006.01)
*B26D 1/06* (2006.01)

(52) U.S. Cl. .................. 83/13; 83/56; 83/693; 83/916; 30/289; 30/228; 30/241

(58) Field of Classification Search .................. 83/916, 83/693, 697, 692, 613, 440.1; 30/228, 241, 30/282, 289, 293, 294, 1; 409/180; 408/69, 408/70, 71
See application file for complete search history.

(56) References Cited

U.S. PATENT DOCUMENTS

| 2,035,448 | A | * | 3/1936 | Andersson | 83/145 |
| 4,158,913 | A | * | 6/1979 | Batson | 30/241 |
| 4,489,492 | A | * | 12/1984 | Diggins | 30/241 |
| 4,748,744 | A | * | 6/1988 | Turner | 30/241 |
| 5,044,080 | A | * | 9/1991 | Keller et al. | 30/228 |
| 6,769,341 | B2 | * | 8/2004 | Wu | 83/693 |

* cited by examiner

*Primary Examiner*—Boyer D. Ashley
*Assistant Examiner*—Omar Flores Sánchez
(74) *Attorney, Agent, or Firm*—Robert J Doherty

(57) ABSTRACT

A cutting die head assembly for nibbler tools which enables the die head to be independently rotatably manipulated by the user's hand independent of its axial connection with the die body to provide for angular and/or circular cuts in areas of limited space use and thus avoiding the necessity of moving the nibbler body and attached drill in a similar path.

1 Claim, 6 Drawing Sheets

DIE HEAD ASSEMBLY FOR NIBBLER TOOL

Applicant claims the benefit of U.S. Provisional Patent Application Ser. No. 60/440,930 filed Jan. 17, 2003.

BACKGROUND OF THE INVENTION

This invention relates to nibbling tools and more specifically to a nibbling tool incorporating a unique die head structure that enables hand direction of the cutting path afforded thereby as opposed to a path determined solely by the directional path of the overall tool including the rotary drill.

Nibbling tools have been available in various forms for many years and include those set forth in UK Patent No. 1,485,795 published Sep. 14, 1977; U.S. Pat. No. 4,489,492 issued Dec. 25, 1984; U.S. Pat. No. 4,748,744 issued Jun. 7, 1988 and U.S. Pat. No. 4,158,913 issued Jun. 26, 1979.

All of the above-noted patents disclose a nibbler tool that includes a single die cutting head and a punch or blade that reciprocates with respect to the die. A source of rotary motion such as a rotary drill is attached to a shaft extending from the rear of the nibbler tool and connected thereto. A handle extends outwardly from the body of the tool in order for the operator to manipulate the tool by grasping both the handle as well as the drill body. In some advanced nibbler tools, a second die head is provided. In such double-ended tools depending upon which die head is utilized for cutting operation at any one time, the other die head is provided with a removable grip or handle that fits firmly over the outside surfaces thereof.

The die head has an entry area or slot for receipt of sheet material such as a thin sheet metal and is provided with a cutting surface that cooperates with the punch or blade. During operation, the punch or blade reciprocates in a linear motion and cooperates with the die cutting surface to bite or nibble a small crescent-shaped piece of material from the sheet with each punch stroke. As the operator's hands guide the tool, the nibbler tool cuts a slot in the direction of motion, that is, the movement of the tool including the drill determines the cutting path. Obviously if it is desired to cut angular or curved slots especially in small spaces, it is extremely difficult to manipulate the tool in the desired cutting path; and, accordingly, this is a drawback of such tools.

Accordingly, it would be highly desirable to be able to provide nibbler tools of the above type with a mechanism that would enable them to be more easily utilized in tight quarters and provide for the movement of the cutting die head independent of the remainder of the tool and the power drill attached thereto. Accordingly, it is the object of the present invention to provide a cutting tool structure having a cutting die head that can be rotated independently of the tool body via one's fingers by providing forward and/or angular motion to the tool by grasping the drill in the other hand. These and other objects of the present invention are accomplished by mounting the die head on the body of the nibbler tool such that it is restrained from axial movement therewith but is free to rotate as determined by the manipulation of the worker's hand in maneuvering the direction of the cutting path. Such independent die cutting head movement enables angular and/or circular cutting paths to be achieved without the attendant movement of the nibbler tool body and attached drill in the same angular and/or circular movement. In this way, angular and/or circular cutting paths can be achieved while utilizing the nibbler tool in restricted areas where similar movement of the tool and attached drill cannot be accomplished due to potential contact with other structures in the work area.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DETAILED DESCRIPTION OF THE INVENTION

Figure 1:
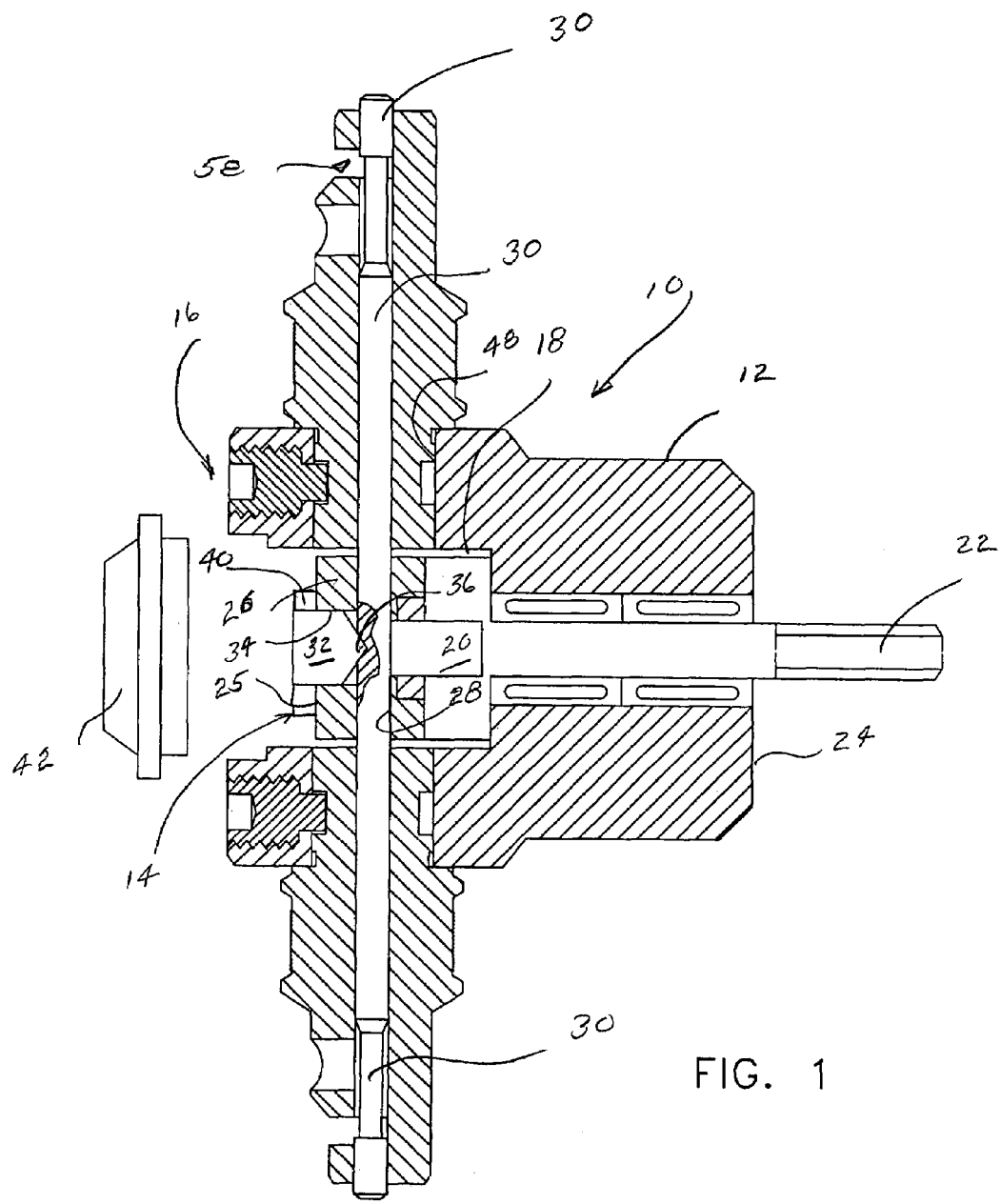
FIG. 1 shows a cross-sectional view of a prior art nibbler tool.

Turning now to the drawings and particularly to FIG. 1, the nibbler 10 shown therein includes a body 12 of generally cylindrical shape and including an open bore 14 at the top 16 thereof which part forms an internal cavity 18. A drive mechanism 20 is located in the cavity and is utilized to transfer rotary movement from a drive shaft 22 to reciprocating longitudinal movement of a blade connector. The shaft extends through the base 24 of the body 12 and connected to the drive mechanism at one end thereof and a source of rotary motion such as a rotary drill (not shown) at the other end thereof. The drive mechanism is, in turn, connected to a blade location block 25 which includes a longitudinally extending body 26 having a longitudinal bore 28 therethrough adapted to receive and removably connect the nibbler blade 30 thereto. The drive mechanism may be of any known appropriate structure and of itself forms no part of the present invention.

A setscrew 32 is adapted to be threaded into an upper bore 34 in the blade location block and is provided with a conically-shaped forward end 36 that extends into a depression 38 centrally formed in the blade 30. A lock 40 in the form of a nut having an internal threaded bore that engages both the setscrew and the top surface of the blade block is provided to assure continual fixed engagement of the blade location block to the blade. End cap 42 is provided to close the opening of the body 12. Normally, a spring clip (not shown) is utilized to hold the end cap in position, but other means can be utilized.

A pair of aligned bores 48 extend through opposed sides of the body 12 in alignment with the blade location block bore but each of far greater diameter to respectively receive an inner forward cylindrically-shaped end 50 of each of the dies 52. The dies include a central bore 54 to receive the blade—each bore being aligned with each other such that the blade may reciprocate upon drive shaft movement longitudinally within the compositely formed structure and operate to cut sheet material as it is fed into the receiving slot 58 of each die by the forward movement of the device vis-a-vis the sheet as is known in the art.

It will be apparent from the above description of the prior art device that each die is fixedly connected to the body 12, such connection being made via a setscrew 60 downwardly extending through the secondary bore 62 provided in the top surface of the body and extending downwardly and opening at the bores 48 if two dies are mounted in the body. Of course if only one die is mounted, only one above-described connecting mechanism at one side of the body is needed, however, a tight fitting sleeve may be placed over the second die when utilized and such sleeve can serve as a guide or grasping surface for manipulating the tool or the operator can simply grasp the body of the rotary drill connected to shaft 22. By tightening the setscrews 60 into contact with the outer surface of the cylindrically-shaped end 50 thereof, the die 52 is fixedly attached to the body 12; and, accordingly, the entry slot 58 into which the sheet material to be cut is received is positioned in a single direction. Thus if the direction of the slot to be cut in the sheet material must be changed, then the body as well as the attached rotary drill has to be moved in a similar direction.

Figure 2:
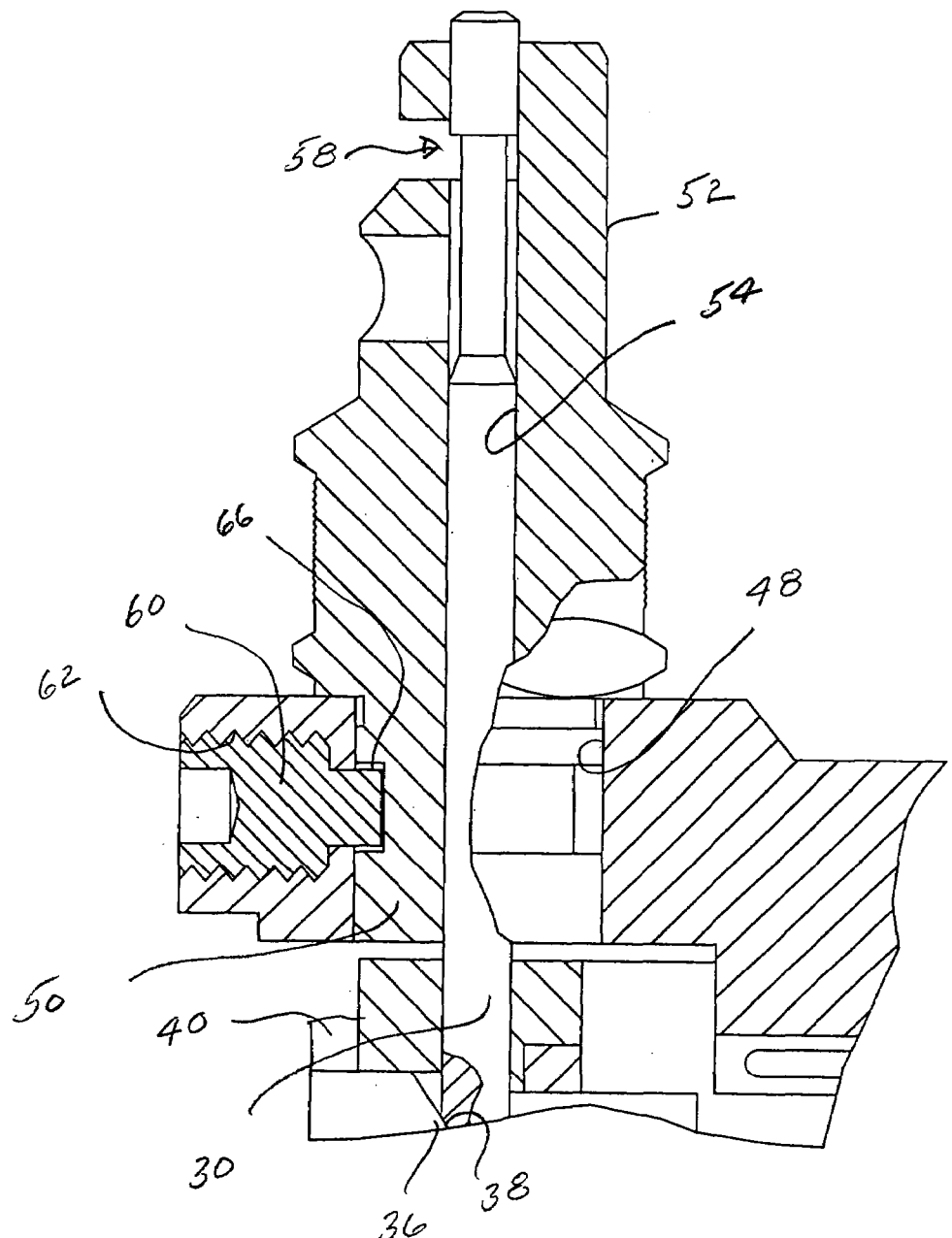
FIG. 2 shows a cross-sectional view of a nibbler tool incorporating the present invention.
Figure 3:
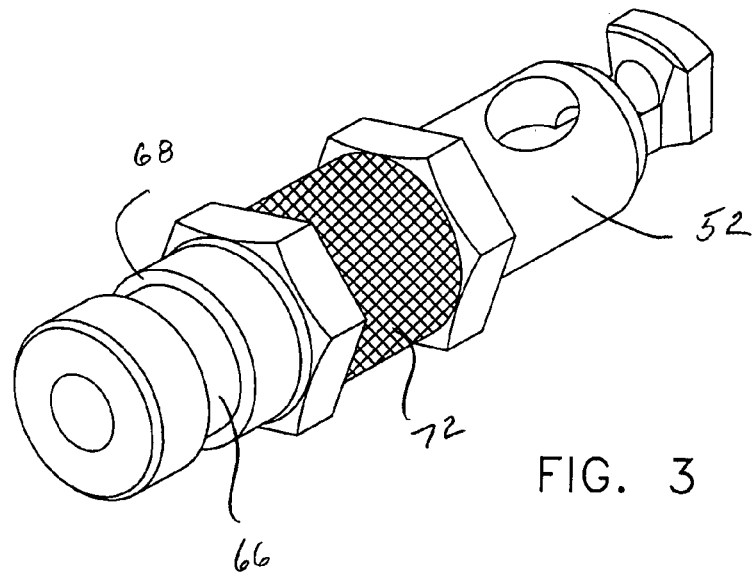
FIG. 3 is an elevational view of one die of the nibbler tool of FIG. 2 showing the manner in which such is attached to the nibbler body to achieve rotational movement with respect thereto.
Figure 4:
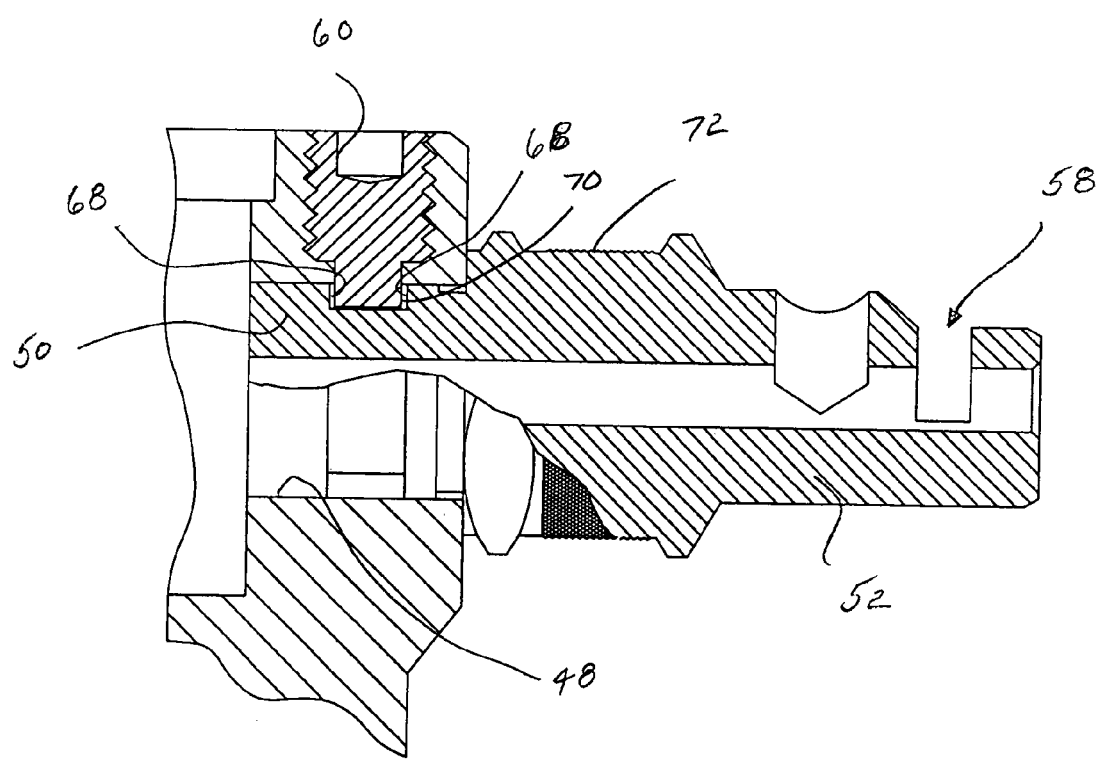
FIG. 4 is partial sectional view through FIG. 2 to show how the axially limiting setscrew extends into a circular groove in the die head body which restrains such from axial movement but does not fixedly position such with respect thereto.
Figure 5:
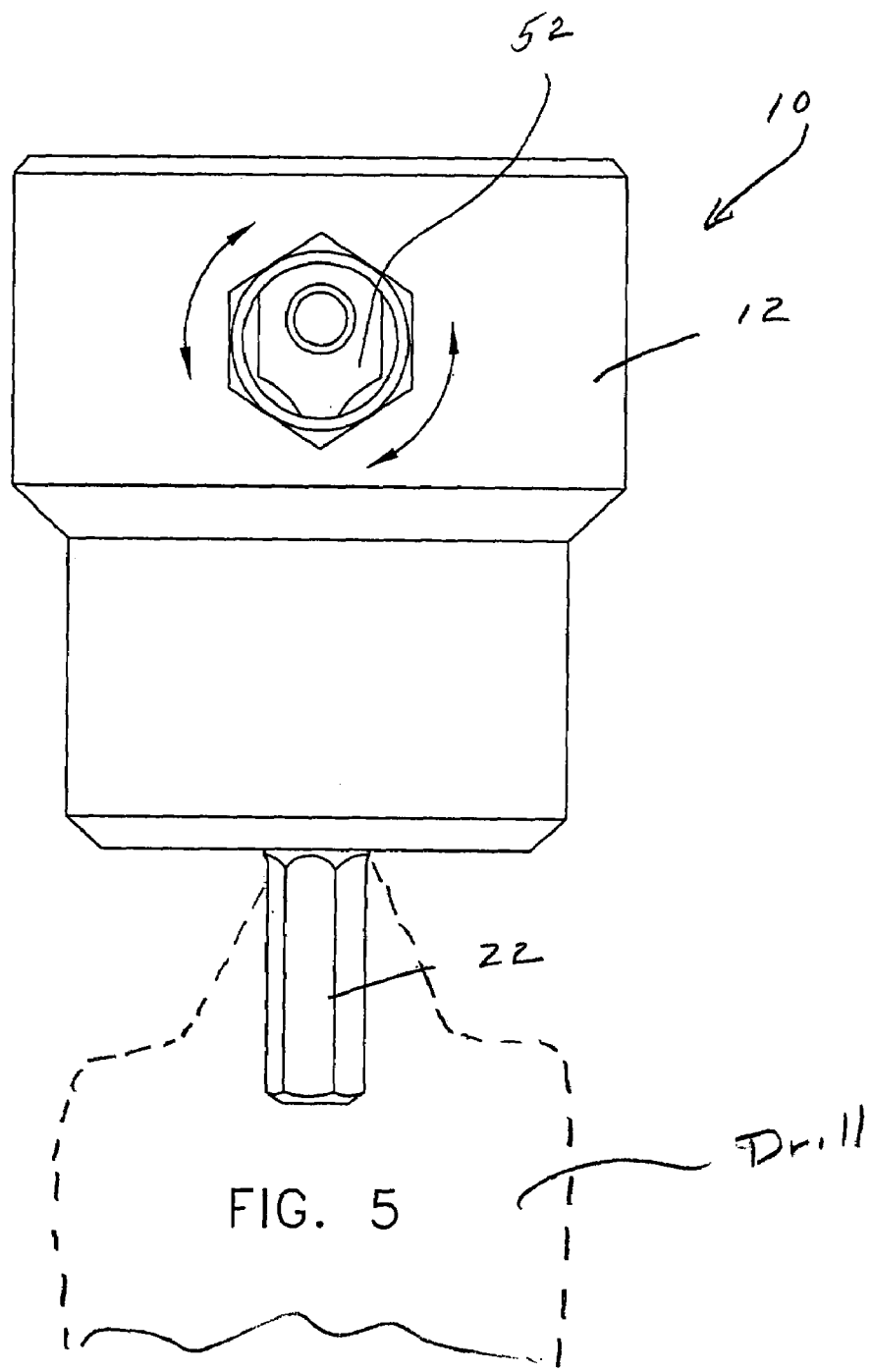
FIG. 5 is a side elevational view of one end of the body showing the circular motion which the die head is mounted with respect thereof.
Figure 6:
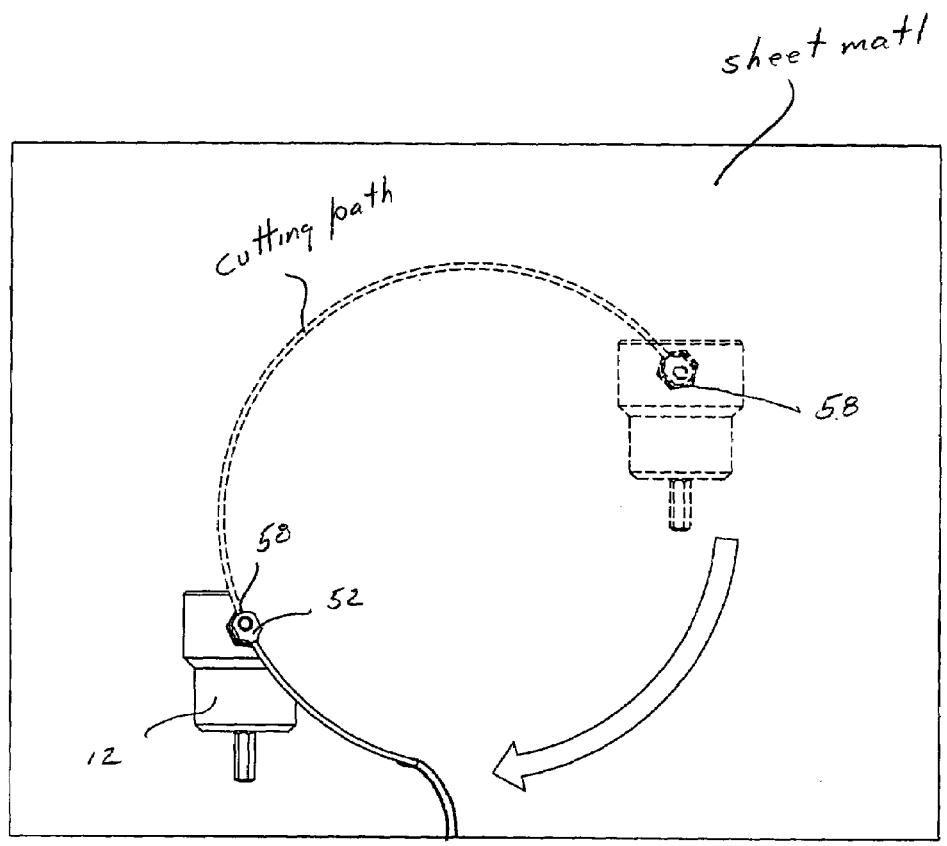
FIG. 6 is a schematic view showing the manner in which the die head may be manipulated by the user in a tight position such that a circular cutting path is achieved while providing substantially only forward and rearward motion to the tool and connected drill.
Figure 7:
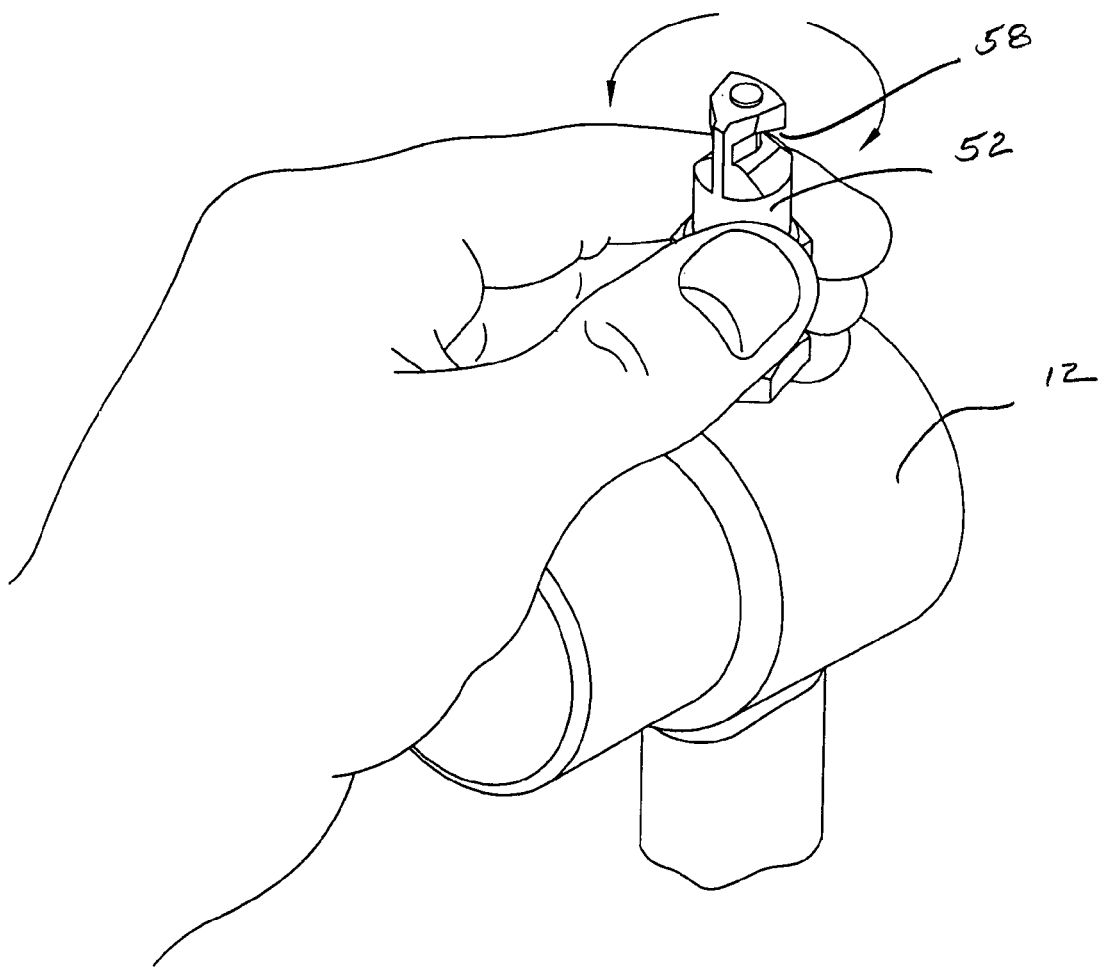
FIG. 7 is a perspective view showing the manner in which the die head is hand manipulated to control the cutting path.

Turning now to FIG. 2, it will be apparent that the immediately above aforementioned restriction to prior art tools of this type is eliminated by providing a downwardly extending circular groove 66 at the cylindrically-shaped end 50 of each of the dies 52. In this way, the end of the setscrew 60 can be downwardly screwed so as to extend into such groove 66 but not touch contact the bottom base thereof to restrain the die head 52 from axial movement with respect to the body 12 but not limit the ability of the die head 52 to rotate with respect thereto. This assumes the setscrew 60 is of an axial extent slightly less than that of the groove, which is the case. When axial movement is attempted in either direction, the opposing wall areas 68 of the groove contact the opposed wall areas 70 of the setscrew restraining such axial movement. However, the ability of the die head to rotate as particularly shown in FIG. 6 is not restrained.

An intermediate section of the die head 52 is provided with a knurled surface 72 to aid the operator in manipulating such die. Thus as shown in FIG. 6, while moving the drill and body in an upward path, the die head can be simultaneously turned by the operator's hand in contact with die head 52 to present its receiving slot 58 in an outward angular position and then twist it again in a an inward angular direction and thence the reverse of such movements while the drill and body are moved downwardly to form a circular cut 76 as shown. During such tool manipulation, the tool may be supported by the operator's hands, one hand on the drill or housing and the other hand on the die cutting head. The drill may be in a fixed on position or controlled by the operator. Obviously, other types of angular and/or circular curved cuts may be accomplished by such technique. Also in those instances when the tool is not being utilized in close or small spatial environments and the operator otherwise chooses not to manipulate the cutting path by the movement of the die head relative to its connecting body, then the setscrew 60 can simply be screwed downward until its bottom surface 63 contacts the upper surface 64 of the channel 64 and thus provides a fixed connection therewith similar to such fixed connection in prior art devices.

While there is shown and described herein certain specific structure embodying this invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

I claim:

1. The method of cutting fixed position sheet material with a nibbler tool of the type having a housing supporting a die cutting head detachably fixed thereto and in turn having a punch type blade adapted for linear reciprocal motion with respect to the housing and with respect to a control bore within said die cutting head and wherein the housing includes a centrally disposed means for turning rotary motion into reciprocal linear motion in turn having a blade holding block for fixing the position of said blade to said block and for moving said blade within said central bore so as to effect progressive cutting of sheet material positioned between said die cutting head and said blade, said die cutting head having an inner end adapted for receipt in a die receiving bore formed in said housing, positioning means cooperating with said die cutting inner end and die receiving bore to restrain linear movement between said housing and said die cutting head yet simultaneously permitting operator controlled relative rotary movement of said die cutting head with respect to said housing in a first intermediate position and to restrain all relative movement between the die cutting head and the housing in a second locked position, comprising the steps of placing said positioning means in said first intermediate position wherein relative rotation between the die cutting head and housing is permitted and thereafter hand supporting and moving said tool while in an active cutting operational mode in a cutting path through said sheet material while simultaneously altering said path by manipulating said die head to change the relative rotational position of said die head with respect to said housing.

* * * * *